(12) United States Patent
Wannke

(10) Patent No.: US 6,253,149 B1
(45) Date of Patent: Jun. 26, 2001

(54) ROUTE GUIDANCE SYSTEM

(75) Inventor: Dietmar Wannke, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/269,655

(22) PCT Filed: Sep. 2, 1997

(86) PCT No.: PCT/DE97/01916

§ 371 Date: Jun. 9, 1999

§ 102(e) Date: Jun. 9, 1999

(87) PCT Pub. No.: WO98/15922

PCT Pub. Date: Apr. 16, 1998

(30) Foreign Application Priority Data

Oct. 4, 1996 (DE) .............................................. 196 40 940

(51) Int. Cl.[7] .................................................. G06F 165/00
(52) U.S. Cl. .............................. 701/208; 701/35; 701/66; 701/200; 701/207; 340/988; 340/990; 342/357.01; 342/357.13

(58) Field of Search .................................. 701/24, 25, 35, 701/200, 201, 207, 208, 210, 213, 214, 66; 340/988, 990, 995, 436, 438; 342/357.01, 357.13

(56) References Cited

U.S. PATENT DOCUMENTS

| | | | |
|---|---|---|---|
| 4,973,859 | * 11/1990 | Shodai | 307/10.1 |
| 5,583,715 | * 12/1996 | Miura | 360/99.01 |
| 5,659,476 | * 8/1997 | Lefebvre et al. | 701/201 |

* cited by examiner

*Primary Examiner*—William A. Cuchlinski, Jr.
*Assistant Examiner*—Gertrude Arthur
(74) *Attorney, Agent, or Firm*—Kenyon & Kenyon

(57) ABSTRACT

A navigation system is proposed which stores data concerning the motion states of the motor vehicle. The navigation system is usable as a trip recorder, in particular as an accident data recorder.

17 Claims, 2 Drawing Sheets

ROUTE GUIDANCE SYSTEM

FIELD OF THE INVENTION

The present invention generally relates to a navigation system.

BACKGROUND INFORMATION

A navigation system is described in a periodical Funkschau 5/96, pages 74 et seq. This navigation system, which is intended for installation in a motor vehicle, in particular an automobile, includes several devices for location determination, a permanent memory unit, an input/output unit, and a control system, all of which are located on board the vehicle. Location determination is accomplished on the one hand via Global Positioning System (GPS), which is based on satellites. In addition, compass sensors and wheel rotation sensors are present for relative position determination. A destination can be input under menu control via the input/output unit. The permanent memory unit, a CD-ROM, makes available electronic road and city maps from which the controller calculates a suggested route for the best connection between the current location and the destination.

Conventional trip recorders record the speed of a vehicle over a period of many hours, for example, on a card. These devices are designed, however, so that they record short-term speed changes only after a certain delay. Small changes in speed, and short time intervals, are also very difficult to resolve.

SUMMARY OF THE INVENTION

An arrangement according to the present invention is advantageous in that the motion state of the motor vehicle can be understood with high accuracy in space and time. This becomes particularly significant for determining culpability in the event of an accident. The navigation system is thus simultaneously advantageous as an accident recorder.

It is advantageous additionally to record the speed of the vehicle, since this creates a certain redundancy in the data so that recording errors can easily be corrected.

It is advantageous to store data regarding the motion state of the vehicle, such as position or direction of travel, in a nonvolatile memory, so that the data are retained even if an interruption in power supply occurs.

It is furthermore particularly advantageous, when the memory has been completely filled, to overwrite the oldest data record with the newest one, so that the data most relevant to an explanation of the cause of an accident are available with a high probability.

The memory capacity of the navigation system is used particularly efficiently if vehicle states which remain constant for a long period are stored only twice.

It is advantageous to play back the memory contents via means which are present on the navigation system, for example, via a display, since simple questions about the previous trip can thereby be answered without complex data transfer to other analysis systems.

Moreover, it is particularly advantageous to disable overwriting of the memory either manually, in particular, by actuation of a control element, or by way of a predetermined event, for example, an extreme deceleration or the triggering of an airbag. This ensures that the relevant data for explaining the cause of an accident are available after the accident.

DETAILED DESCRIPTION

Figure 1:
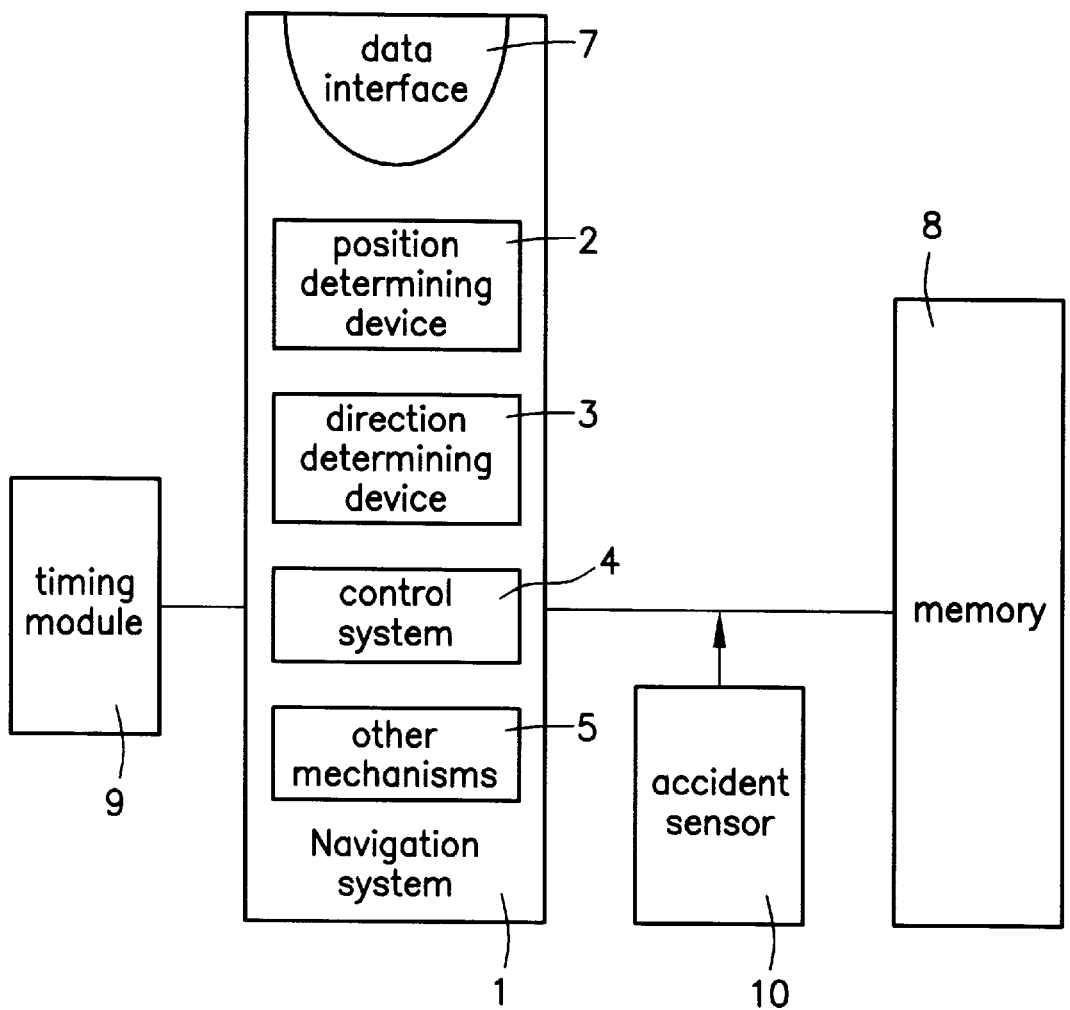
FIG. 1 illustrates an exemplary embodiment of a navigation system according to the present invention.

FIG. 1 shows a navigation system according to the present invention. The number 1 designates a navigation system whose operation is similarly described, for example, in the article cited initially. Navigation system 1 contains a control system 4, a device 2 for position determination, and a device 3 for determining direction of travel. Further mechanisms 5 are combined in FIG. 1 into one unit. A nonvolatile memory 8, which in an exemplary embodiment according to the present invention illustrated here is configured as a random access memory (RAM) with battery backup, is connected to navigation system 1. Data transfer between navigation system 1 and backed-up memory 8 can be influenced by an accident sensor 10, and interrupted in some circumstances. A timing module 9 is also connected to navigation system 1. Navigation system 1 has an interface 7 through which data can be read out. The data that can be read out include both the data currently being processed in navigation system 1, and the memory contents of backed-up memory 8.

Figure 2:
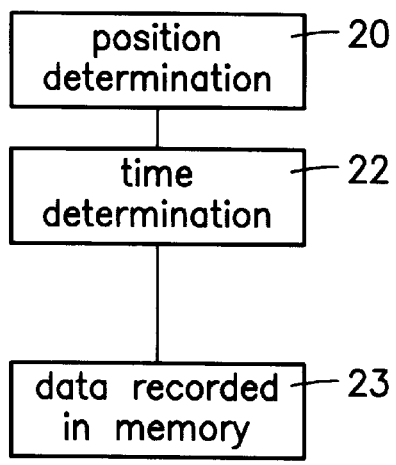
FIG. 2 illustrates a flowchart of the operation of the exemplary embodiment of the navigation system according to the present invention.

The manner in which navigation system 1 operates is explained with reference to the flow chart in FIG. 2. A data processing cycle, controlled by control system 4, begins with position determination 20 by navigation system 1. Position determination 20 is immediately followed by time determination 22. This is accomplished, in the exemplary embodiment according to the present invention illustrated here, with the aid of timing module 9. Alternatively, however, the time can also be taken from the GPS signal. In a subsequent step 23, the data record comprising position data and the associated time is written into nonvolatile memory 8. If all the memory regions already have data records written to them, the oldest data record is erased and is replaced by the data record being written.

Data storage is disabled as soon as an indication of an accident is present. In the present example, this is the triggering of an airbag, which is reported by accident sensor 10. Data storage can also be deactivated manually. Alternatively, accident sensor 10 can also be configured as an acceleration sensor, and can thus report an extraordinary operating state. In the event of an accident, the memory contents can be read out via interface 7. The data can then be processed further using conventional means, for example, in a different computer. From the data records including position and time data it is possible, for example, to calculate the speed and the deceleration or acceleration of the vehicle.

Figure 3:
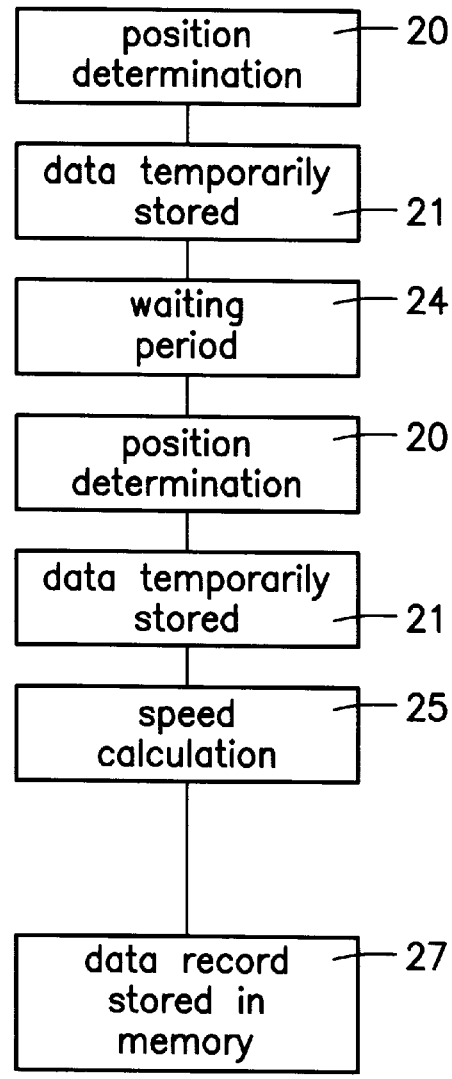
FIG. 3 illustrates a flowchart of the operation of another exemplary embodiment of the navigation system according to the present invention.

As an alternative to this, the instantaneous speed can be calculated in navigation system 1 and written, together with the associated position and time, into nonvolatile memory 8. The functional sequence resulting from this is depicted in FIG. 3. In a first step 20, a first position is measured, and in a second step 21 it is stored temporarily. This is followed by a waiting step 24 which lasts for a short time interval DT, which is measured by timing module 9 and advantageously is predefined. Another position determination is made in a subsequent step 20, followed by a temporary storage step 21 in which the second position is also stored in the temporary memory. In calculation step 25, the speed is calculated from these two data records, by dividing the distance traveled by the time interval. In a following step 27, the data record— made up of the position at the end of the time interval, the speed, and the time of the second position determination—is stored in nonvolatile memory 8. As in the previous example, the oldest data record is overwritten as soon as nonvolatile memory 8 is full.

The present invention contemplates many possibilities for modifying the examples set forth above. For example, it is equivalent to the functionality presented above to store a data record comprising the position at the beginning of the time interval, the speed, and the time at the beginning of the time interval.

Since the direction of travel has already been acquired by the navigation system, it is both possible and desirable to store the direction of travel. On the one hand, it is conceivable that the direction of travel may be relevant for explaining the cause of an accident; on the other hand, the speed in a curve can be calculated more accurately from the position data, since there is no need to resort to a linear interpolation in order to calculate the distance traveled.

A further possible embodiment according to the present invention results from the fact that navigation system 1 has devices for measuring speed. This simplifies operation, since the measured speed can be stored, along with a position determined at the same time and the particular time, as a data record A further possible embodiment according to the present invention results from the fact that the contents of the nonvolatile memory are personalized. In this context, data about the driver or the vehicle can be input at the beginning of the trip or at any desired later time. This can be done using the same input device of navigation system 1 that is already present for inputting a desired destination. The data that are input can then, preferably together with the time at which they were input, also be stored in the nonvolatile memory. In this case it is advantageous to exempt these personalization data from overwriting of the respective oldest data record.

Moreover, a further possible embodiment according to the present invention which has the advantage of using memory 8 more efficiently results from the fact that the control system compares the position in the last two stored data records with the position in the new data record that is to be stored, and stores the new data record only if at least two of the three positions contained in the data records differ from one another. This prevents the memory from being filled up with redundant information when the vehicle is stationary for long periods.

What is claimed is:

1. A navigation system, based on electronic maps, for a motor vehicle, comprising:

a device for position determination;

an input device for receiving destination information;

a time detection device; and a memory for storing a predefined number of data records, each of the data records include position data ascertained by the device for position determination and corresponding time data from the time detection device, the memory storing a particular data record only if the position data of the particular data record differs from at least one of the position data of two most recently stored data records.

2. The navigation system according to claim 1, wherein the motor vehicle is an automobile.

3. The navigation system according to claim 1, further comprising:

a device for measuring a speed of the motor vehicle, the measured speed being stored in the memory.

4. The navigation system according to claim 1, further comprising:

a device for calculating a speed of the motor vehicle, the calculated speed being stored in the memory.

5. The navigation system according to claim 1, wherein the memory is a nonvolatile memory.

6. The navigation system according to claim 1, wherein the memory is a random access memory (RAM) with a battery backup.

7. The navigation system according to claim 1, wherein after the memory has been completely filled with the data records, oldest data records are first to be overwritten.

8. The navigation system according to claim 1, further comprising:

means for playing back contents of the memory.

9. The navigation system according to claim 1, further comprising:

an interface for reading out contents of the memory.

10. The navigation system according to claim 1, wherein the memory is manually disabled.

11. The navigation system according to claim 1, wherein the memory is disabled automatically upon an occurrence of a predetermined event.

12. The navigation system according to claim 11, wherein the predetermined event is a generation of an accident signal.

13. The navigation system according to claim 11, wherein the predetermined event is a pronounced deceleration of the motor vehicle.

14. The navigation system according to claim 11, wherein the predetermined event is a triggering of an airbag of the motor vehicle.

15. The navigation system according to claim 1, wherein the memory stores data about a driver of the motor vehicle and about the motor vehicle.

16. The navigation system according to claim 1, further comprising:

a device for determining a direction of travel of the motor vehicle, direction-of-travel data ascertained by the device for determining the direction of travel being stored in the memory.

17. A simultaneous navigation and accident recorder, based on electronic maps, for a motor vehicle, comprising:

a device for position determination;

an input device for receiving destination information;

a time detection device; and a memory for storing a predefined number of data records, each of the data records include position data ascertained by the device for position determination and corresponding time data from the time detection device, the memory storing a particular data record only if the position data of the particular data record differs from at least one of the position data of two most recently stored data records, thereby simultaneously functioning as a navigation and accident recorder.

\* \* \* \* \*

UNITED STATES PATENT AND TRADEMARK OFFICE
CERTIFICATE OF CORRECTION

PATENT NO.    : 6,253,149 B1
DATED         : June 26, 2001
INVENTOR(S)   : Wannke, Dietmar It is certified that error appears in the above-identified patent and that said Letters Patent is hereby corrected as shown below:

Title page, Item [54] and Column 1, line 1,
Change the title from "ROUTE GUIDANCE SYSTEM" to -- NAVIGATION SYSTEM BASED ON ELECTRONIC MAPS FOR A MOTOR VEHICLE --

Column 1,
Line 9, change "This" to -- The --

Signed and Sealed this

Twelfth Day of November, 2002

Attest:

JAMES E. ROGAN
Attesting Officer
Director of the United States Patent and Trademark Office